US012775821B2

(12) United States Patent
Kim et al.

(10) Patent No.: US 12,775,821 B2
(45) Date of Patent: Oct. 27, 2026

(54) DEVICE AND METHOD WITH FLEXIBLE NEURAL NETWORK

(71) Applicant: Samsung Electronics Co., Ltd., Suwon-si (KR)

(72) Inventors: Minje Kim, Suwon-si (KR); Soon-Wan Kwon, Suwon-si (KR); Wooseok Yi, Suwon-si (KR); Jangho An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 18/344,201

(22) Filed: Jun. 29, 2023

(65) Prior Publication Data

US 2024/0249110 A1 Jul. 25, 2024

(30) Foreign Application Priority Data

Jan. 25, 2023 (KR) ........................ 10-2023-0009684

(51) Int. Cl.
*G06N 3/04* (2023.01)

(52) U.S. Cl.
CPC ..................................... *G06N 3/04* (2013.01)

(58) Field of Classification Search
None
See application file for complete search history.

(56) References Cited

U.S. PATENT DOCUMENTS 11,373,719 B1 6/2022 Behera
11,836,463 B2 * 12/2023 Kim ...................... G06F 7/5443
11,893,485 B2 * 2/2024 Ioffe ........................ G06N 3/08
12,518,167 B1 * 1/2026 Vivekraja ............. G06N 3/084
2016/0342891 A1 11/2016 Ross et al.

(Continued)

FOREIGN PATENT DOCUMENTS

CN 112667289 A 4/2021
KR 10-2022-0010362 A 1/2022

OTHER PUBLICATIONS

Vahid et al. "Embedded System Design: A Unified Hardware/Software Approach" *Department of Computer Science and Engineering University of California*, 1999 (pp. 1-103).

(Continued)

*Primary Examiner* — Olabode Akintola
(74) *Attorney, Agent, or Firm* — NSIP Law

(57) ABSTRACT

A device includes: an operation module configured to store and operate a weight for an operation of a layer of a neural network model; a control module configured to generate setting information for performing the operation of the layer by the neural network model using the stored weight; an input module configured to receive input data for the operation of the layer based on the generated setting information; a merging module configured to receive operation results of the operation of the layer from the operation module and merge the received operation results of the layer; a post-processing module configured to receive the merged operation results of the layer from the merging module and post-process the received merged operation results of the layer; and an output stream module configured to convert and store the post-processed operation results based on the generated setting information.

20 Claims, 14 Drawing Sheets

(56) References Cited

U.S. PATENT DOCUMENTS

| | | | | |
|---|---|---|---|---|
| 2021/0073619 | A1 | 3/2021 | Wang et al. | |
| 2022/0019408 | A1 | 1/2022 | Kim et al. | |
| 2022/0092394 | A1* | 3/2022 | Lee | G06N 3/063 |
| 2022/0230020 | A1 | 7/2022 | Saeugling | |
| 2022/0318610 | A1 | 10/2022 | Seo et al. | |
| 2022/0318628 | A1 | 10/2022 | Cherupally et al. | |
| 2022/0334801 | A1 | 10/2022 | Wang et al. | |
| 2022/0343147 | A1* | 10/2022 | Kwon | G06N 3/049 |

OTHER PUBLICATIONS

Korean Office Action issued on Aug. 28, 2026, in counterpart Korean Patent Application No. 10-2023-0009684 (2 pages in English, 6 pages in Korean).

* cited by examiner

DEVICE AND METHOD WITH FLEXIBLE NEURAL NETWORK

CROSS-REFERENCE TO RELATED APPLICATIONS

This application claims the benefit under 35 USC § 119(a) of Korean Patent Application No. 10-2023-0009684, filed on Jan. 25, 2023 in the Korean Intellectual Property Office, the entire disclosure of which is incorporated herein by reference for all purposes.

BACKGROUND

1. Field

The following description relates to a device and method with a flexible neural network.

2. Description of Related Art

A large deep learning model may be used to solve complex problems. However, the number of parameters of a deep learning language model may be at least hundreds or thousands of times greater than that of previous language models, and thus, high-performance computing power and computational acceleration may be essential to perform inference by training the language model with large-scale data. Accordingly, low-power artificial intelligence processors, such as neuromorphic processors that perform neural network operations in parallel by in-memory computing (IMC), may be used to implement the language model.

The neuromorphic processor may be used as a neural network device that operates a neural network with low power based on an IMC module, and may be used in various fields including data classification, image recognition, or natural language processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a device includes: an operation module configured to store and operate a weight for an operation of a layer of a neural network model; a control module configured to generate setting information for performing the operation of the layer by the neural network model using the stored weight; an input module configured to receive input data for the operation of the layer based on the generated setting information; a merging module configured to receive operation results of the operation of the layer from the operation module and merge the received operation results of the layer; a post-processing module configured to receive the merged operation results of the layer from the merging module and post-process the received merged operation results of the layer; and an output stream module configured to convert and store the post-processed operation results based on the generated setting information.

For the generating of the setting information, the control module may be configured to: generate information on a configure register configured to drive the device based on setting data for the operation of the layer; and generate information on a control signal for controlling an operation according to cycles of the device.

The control signal may include: a signal for controlling the device to move input feature map data between different types of buffers; a signal for controlling the device to move input feature map data between a same type of buffers; and a signal for notifying that an output value generated in a specific cycle is valid.

For the operating of the layer of the neural network model, the operation module may be configured to: in response to a correction range value being a predetermined first value, reduce a byte size of a digital value of the operation result; and in response to the correction range value being a predetermined second value, extend the byte size of the digital value of the operation result.

For the operating of the layer of the neural network model, the operation module may be configured to move a center value of the operation based on a center value movement range value.

For the post-processing of the result value of the operation, the post-processing module may be configured to: perform a post-processing operation of any one or any combination of any two or more of pooling, batch normalization, activation, and output result bit conversion; and store a result value of the operation obtained by converting a result of the post-processing operation based on the setting information.

For the post-processing operation, the post-processing module may be configured to perform the post-processing operation, in response to a signal value for notifying that an output value generated in a specific cycle is valid being received.

The device may include an interface module configured to, for the receiving of the input data, convert the received input data related to data in a column direction.

The device may include a memory configured to, for the receiving of the input data, reformat data while reusing the data through a shift buffer.

The input module may be configured to: store the operation result in a buffer; and receive the stored operation result in a predetermined order.

The operation module may have a hierarchical structure.

In one or more general aspects, a method includes: storing a weight for an operation of a layer of a neural network model; generating setting information for performing the operation of the layer by the neural network model using the stored weight; receiving input data for the operation based on the generated setting information; performing the operation of the layer based on the received input data; post-processing a result value of the performing of the operation; and storing the result value of the operation.

The generating of the setting information may include: generating information on a configure register configured to drive a device based on setting data for the operation of the layer; and generating information on a control signal for controlling an operation according to cycles of the device.

The control signal may include: a signal for controlling the device to move input feature map data between different types of buffers; a signal for controlling the device to move input feature map data between a same type of buffers; and a signal for notifying that an output value generated in a specific cycle is valid.

The operating of the layer of the neural network model may include: in response to a correction range value being a predetermined first value, reducing a byte size of a digital value of the operation result; and in response to the correction range value being a predetermined second value, extending the byte size of the digital value of the operation result.

The operating of the layer of the neural network model may include moving a center value of the operation based on a center value movement range value.

The post-processing of the result value of the operation may include: performing a post-processing operation of any one or any combination of any two or more of pooling, batch normalization, activation, and output result bit conversion; and storing the result value of the operation obtained by converting a result of the post-processing operation based on the setting information.

The post-processing operation may be performed in response to a signal value for notifying that an output value generated in a specific cycle is valid being received.

The receiving of the input data for the operation may include converting the received input data related to data in a column direction.

The receiving of the input data for the operation may include reformatting data while reusing the data through a shift buffer.

Other features and aspects will be apparent from the following detailed description, the drawings, and the claims.

Figure 1:
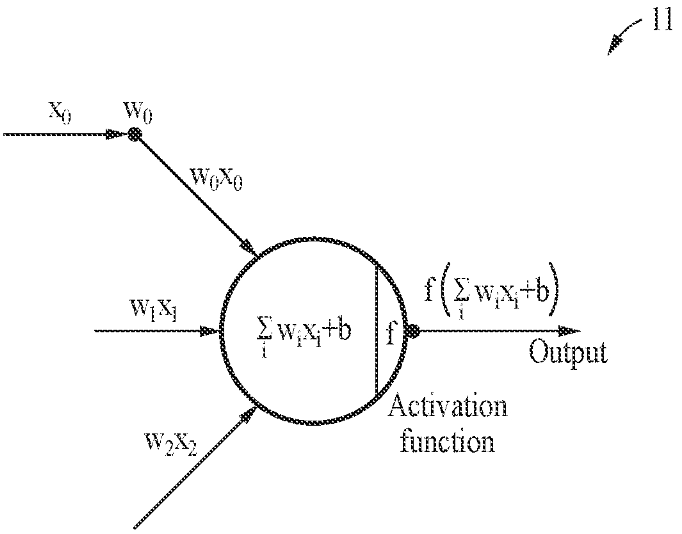
FIG. 1 illustrates an example of a node model and an operation thereof.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms, such as “first,” “second,” and “third”, or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being “connected to,” “coupled to,” or “joined to” another component or element, it may be directly (e.g., in contact with the other component or element) “connected to,” “coupled to,” or “joined to” the other component or element, or there may reasonably be one or more other components or elements intervening therebetween. When a component or element is described as being “directly connected to,” “directly coupled to,” or “directly joined to” another component or element, there can be no other elements intervening therebetween. Likewise, expressions, for example, “between” and “immediately between” and “adjacent to” and “immediately adjacent to” may also be construed as described in the foregoing.

The terminology used herein is for describing various examples only and is not to be used to limit the disclosure. The articles “a,” “an,” and “the” are intended to include the plural forms as well, unless the context dearly indicates otherwise. As used herein, the term “and/or” includes any one and any combination of any two or more of the associated listed items. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meaning as commonly understood by one of ordinary skill in the art to which this disclosure pertains and based on an understanding of the disclosure of the present application. Terms, such as those defined in commonly used dictionaries, should be construed to have meanings matching with contextual meanings in the relevant art and the present disclosure, and the present disclosure, and are not to be construed as an ideal or excessively formal meaning unless otherwise defined herein.

The phrases “at least one of A, B, and C”, “at least one of A, B, or C”, and the like are intended to have disjunctive meanings, and these phrases “at least one of A, B, and C”, “at least one of A, B, or C”, and the like also include examples where there may be one or more of each of A, B, and/or C (e.g., any combination of one or more of each of A, B, and C), unless the corresponding description and embodiment necessitates such listings (e.g., “at least one of A, B, and C”) to be interpreted to have a conjunctive meaning. The use of the term “may” herein with respect to an example or embodiment, e.g., as to what an example or embodiment may include or implement, means that at least one example or embodiment exists where such a feature is included or implemented, while all examples are not limited thereto.

FIG. 1 illustrates an example of a node model and an operation thereof.

A node model 11 may implement a neuromorphic operation including a multiplication operation that multiplies information from a plurality of nodes by a synaptic weight, an addition operation Σ on values $\omega_0 x_0$, $\omega_1 x_1$, and $\omega_2 x_2$ multiplied by the synaptic weight, and an operation that applies the characteristic function b and the activation function f to the result of the addition operation. Neuromorphic operation results may be provided by the neuromorphic operation. Here, values such as $x_0$, $x_1$, $x_2$, . . . may be referred to as axon values, and values such as $\omega_0$, $\omega_1$, $\omega_2$, . . . may be referred to as synaptic weights. Herein, such reference to "neuromorphic operations," "synaptic weights," "axon values," etc. is not intended to impart any relatedness with respect to how the node model 11 and/or neural network architecture computationally maps or thereby intuitively recognizes information and how biological neurons operate. I.e., the terms are merely terms of art referring to the hardware-implemented node model 11 and/or neural network architecture.

Figure 2:
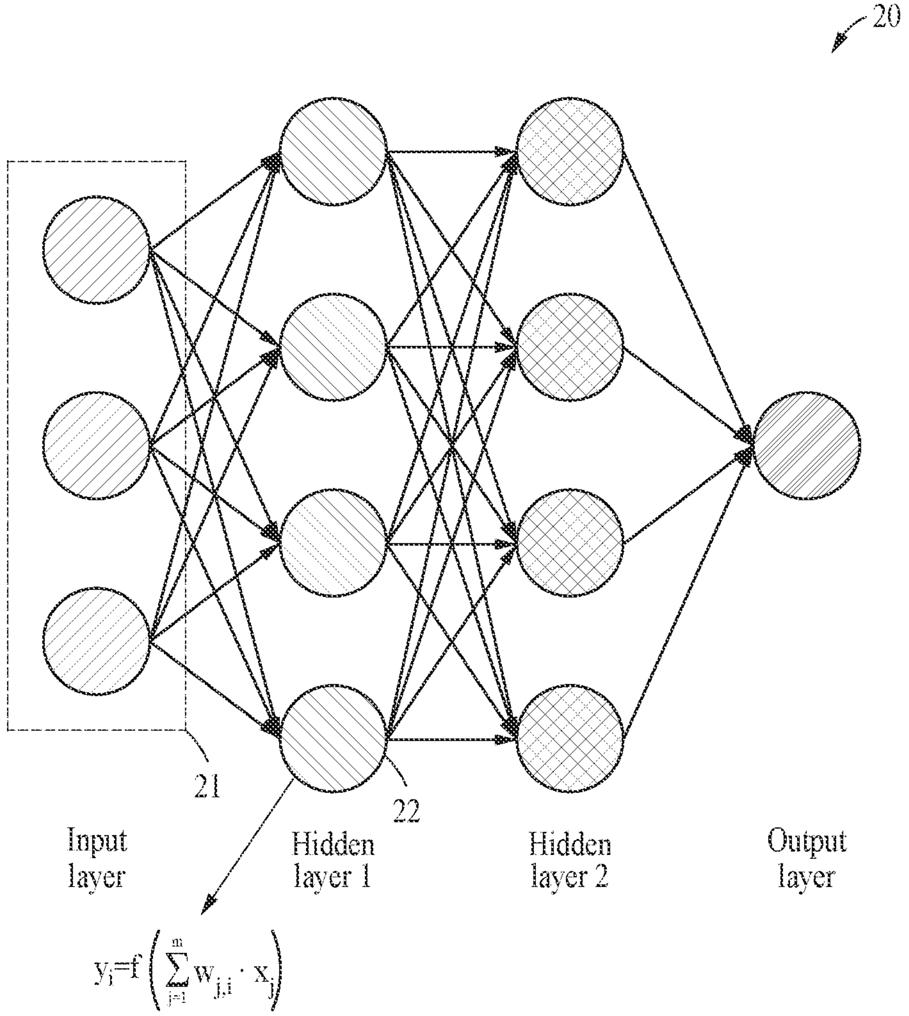
FIG. 2 illustrates an example of a neural network.

FIG. 2 illustrates an example of a neural network.

Referring to FIG. 2, a neural network 20 may be an example of an artificial neural network comprising the node model 11 described above and may correspond to a deep neural network (DNN). For ease of description, the example that the neural network 20 includes two hidden layers is illustrated. However, the neural network 20 may include various numbers of hidden layers. For example, the neural network 20 may include three or more hidden layers. In addition, although the neural network 20 is illustrated in FIG. 2 as including a separate input layer 21 to receive input data, the input data may be directly input to a hidden layer.

In the neural network 20, artificial nodes of layers other than an output layer may be connected to artificial nodes of a subsequent layer via links to transmit an output signal. Values obtained by multiplying node values of artificial nodes included in the previous layer by weights allocated to each link may be input to one artificial node via the links. Node values of the previous layer may correspond to axon values and the weights may correspond to synaptic weights. The weight may be referred to as a parameter of the neural network 20. The activation function may include sigmoid, hyperbolic tangent (tanh), and rectified linear unit (ReLU), and nonlinearity of the neural network 20 may be formed by the activation function.

An output of one arbitrary node 22 included in the neural network 20 may be expressed by Equation 1 below, for example.

$$y_i = f\left(\sum_{j=1}^{m} w_{j,i} x_j\right) \quad \text{Equation 1}$$

Equation 1 may represent an output value $y_i$ of an i-th node 22 for m input values in an arbitrary layer. $x_j$ may represent an output value of a j-th node of the previous layer and $w_{j,i}$ may represent a weight applied to a connection part of the j-th node of the previous layer and the i-th node 22 of the current layer. f( ) may represent an activation function. As shown in Equation 1, for the activation function, a multiply-accumulate result of an input value $x_j$ and a weight $w_{j,i}$ may be used. In other words, a multiply-accumulate (MAC) operation of an appropriate input value $x_j$ and a weight $w_{j,i}$ at a desired time point may be repeated. In addition to the use, various application fields requiring the MAC operation may exist and for this purpose, a processing unit that may process the MAC operation in an analog circuit area may be used.

A node of a neural network may include a combination of weights or biases. The neural network may include a plurality of nodes or a plurality of layers constituted by nodes. The neural network may infer a desired result from a predetermined input by changing the weights of the nodes through training.

The neural network may include a DNN. The neural network may include a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

Figure 3:
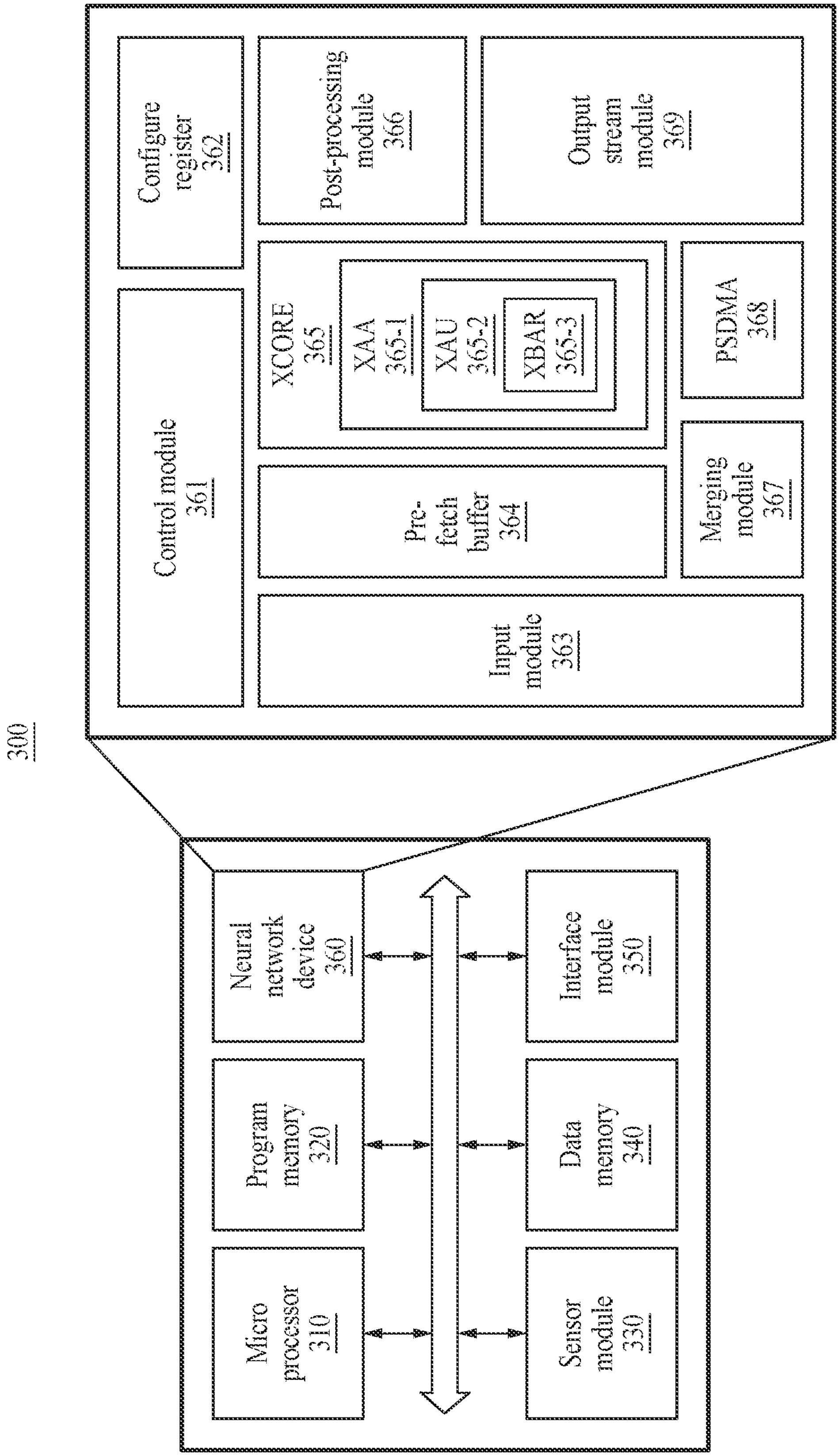
FIG. 3 illustrates an example of a configuration of a flexible neural network device.

FIG. 3 illustrates an example of a configuration of a flexible neural network device.

A general-purpose processor (GPP), a type of processor, has an advantage of being used in various application fields, but may include several complicated components. The GPP may be operated with a common data path and may include circuits configured to perform general-purpose calculations such as a program memory, data memory, register file, controller, and common arithmetic operation device. Also, in a computing system with the Von Neumann structure in which an arithmetic device and a storage device are separated, a bottleneck may occur when data is moved from the storage device to the operation device, which may cause great total power consumption and a deterioration in performance of the system.

A single-purpose processor (SPP), another type of processor, is a single-purpose chip and may be developed into a high-speed chip, a low-power chip, and/or a small chip depending on a processing purpose of the SPP, and thus the SPP is developed by forming a processor as a unit circuit constructed for the purpose. A neuromorphic processor is a low-power artificial intelligence accelerator chip. In an application field of face detection, a specialized circuit for convolution, pooling, and/or activation may be developed and a system may be configured to operate with efficient functions. In order to drive a general-purpose application with a dedicated processor (e.g., the SPP and/or the neuromorphic processor), additional post-processing operations may be performed outside the chip or the help of a co-processor such as a digital signal processing unit (DSP) or micro control unit (MCU) may be used. In this case, movement of input values/result values may be required between additional operation devices, and when the data to be processed is large, intermediate result values may need to be stored in some cases. Accordingly, an inefficient system may result due to an increase in communication costs in proportion to the movement of additional input values, intermediate values, and/or result values.

An electronic device of one or more embodiments may implement general-purpose applications in driving various neural network models in view of the advantages and disadvantages of the dedicated processor and the GPP.

Referring to FIG. 3, an electronic device 300 for driving a flexible neural network device (e.g., a neural network device 360) may include a microprocessor 310 (e.g., one or more processors), a program memory 320 (e.g., one or more memories), a sensor module 330 (e.g., one or more sensors), a data memory 340 (e.g., one or more memories), an interface module 350, and the neural network device 360.

The microprocessor 310 may control the overall operations of the electronic device 300 configured to drive the neural network device 360. The microprocessor 310 may be or include one processor core or may include a plurality of processor cores. The microprocessor 310 may execute programs stored in the program memory 320 and the data memory 340. The microprocessor 310 may control the functions of the sensor module 330 and the interface module 350. The microprocessor 310 may be implemented as a MCU or the like.

The program memory 320 may temporarily store instructions or data for controlling the electronic device 300. The instructions or data stored in the program memory 320 may move to the neural network device 360 included in the electronic device 300 configured to drive a neural network model under the control of the microprocessor 310. The program memory 320 may be implemented as a memory, such as a dynamic random-access memory (DRAM) or a static RAM (SRAM). For example, the program memory 320 may be or include a non-transitory computer-readable storage medium storing instructions that, when executed by the microprocessor 310, configure the microprocessor 310 to perform any one, any combination, or all of operations and methods of the microprocessor 310 disclosed herein with reference to FIGS. 1-9.

The sensor module 330 may collect information around the electronic device 300 on which a neural network system is mounted. The sensor module 330 may sense or receive voice signals or image signals generated from the outside of the electronic device 300, and the sensed or received signals may be primarily processed and converted into the form of input data usable in the neural network device 360 within the sensor module 330 and transmitted to the data memory 340. For example, the sensor module 330 may be or include a camera image sensor, and may generate a video stream by photographing an external environment of the electronic device 300 and provide consecutive data frames as input data having a specific pattern to be used by the neural network device 360. The sensor module 330 may be or include various types of sensing devices such as a microphone, a camera image sensor, and the like.

The data memory 340 is a storage for storing data, and may store various types of data, such as input data and output data to be used by the neural network device 360. The data memory 340 may store data transmitted from the sensor module 330 as the input data, or may receive and store the input data from an external host computer through the interface module 350. The data memory 340 may store result data obtained by performing an operation within the neural network device 360.

The interface module 350 may perform communication between the electronic device 300, on which the neural network system is mounted, and an external device. The interface module 350 may provide a communication method such as the Serial Peripheral Interface (SPI) or a first-in, first-out (FIFO) interface. The interface module 350 may directly access the data memory 340 and use data. When it is difficult to process data conversion in the sensor module 330, the sensing function may be implemented by adding a camera interface function to the interface module 350.

The neural network device 360 may include a control module (e.g., a programmable top control unit (PTCU)) 361 that generates setting information for performing operations of layers of an operation module (a crossbar core (XCORE) 365, a crossbar adder-tree array (e.g., a crossbar adder-tree unit array (XAA)) 365-1, a crossbar adder-tree (e.g., a crossbar adder-tree unit (XAU)) 365-2, and a crossbar (XBAR) 365-3) that stores and operates weights for operations of layers of a neural network model, an input module (e.g., an input fetcher (e.g., an input fetcher unit (IFU))) 363 that receives input data for the operations of the layers based on the setting information, a merging module (a merger) 367 that receives operation results of the layers from the operation module and merges the received operation results of the layers, a post-processing module (e.g., a post-processing unit (PPU)) 366 that receives the operation results of the layers from the merging module and post-process the received merged operation results of the layers, and an output stream module (e.g., an output stream unit (OSU)) 369 that converts the post-processed operation results based on the setting information.

The control module 361 may generate information on a configure register 362 that drives the neural network device 360 based on setting data for the operations of the layers, and generate information on a control signal for controlling an operation according to cycles of the neural network device 360.

The control module 361 may convert program data and instructions fetched from the program memory 320 into the control signal and the configure register 362 such that the neural network device 360 may operate. The neural network device 360 may drive the operation module for various operating scenarios through the control module 361. The configure register 362 may temporarily store register information converted by the control module 361. When the neural network device 360 is driven according to the control signal, the neural network device 360 may operate with reference to the stored configure register 362.

The input module 363 may read an input feature map (IFM) which is input data stored in the data memory 340 and transmit the IFM to a pre-fetcher buffer 364. The input module 363 may generate control information related to a memory address to be read in the data memory 340. The input module 363 may fetch the IFM from the real data memory 340 based on the generated information and store the IFM in a buffer inside the input module 363. Data stored in the buffer may be sequentially transmitted to the pre-fetch buffer 364 according to the control signal of the control module 361. At that time, in a case of input data that is converted into a pattern to be used in the neural network device 360 and directly stored in the data memory 340 from the sensor module 330, the form of data may be reconstructed by shifting the input data, an example of which will be described in more detail with reference to FIGS. 8A and 8B. Since the electronic device 300 of one or more embodiments may repeatedly use input data through the reconstruction of the data form, the electronic device 300 of one or more embodiments may efficiently manage the space of the data memory 340.

The neural network device 360 may further include the pre-fetch buffer 364 that temporarily stores the data received from the input module 363 in an internal buffer and transmits the data to the XCORE 365. At this time, the control signal may be transmitted and received between the input module 363 and the control module 361 according to an allocation state of the data in the internal buffer of the pre-fetch buffer 364.

The MAC operation of the neural network device 360 may be performed through the plurality of operation modules 365, 365-1, 365-2, and 365-3. The operation modules may have a hierarchical structure. An operation may be performed through the XCORE 365. The neural network device 360 may include a plurality of XCOREs. One XCORE 365 may include a plurality of XAAs 365-1. One XAA 365-1 may include a plurality of XAUs 365-2. One XAU 365-2 may include a plurality of XBARs 365-3. The neural network device 360 may merge operation results of the plurality of XAAs 365-1, the plurality of XAUs 365-2, and the plurality of XBARs 365-3 through an adder tree of the neural network device 360. The neural network device 360 may select one of a plurality of operation results through a multiplexer (MUX). The neural network device 360 may enable a flexible in-memory computing operation through the hierarchical structure of the XCORE 365, the XAA 365-1, the XAU 365-2, and the XBAR 365-3. For example, the XBAR 365-3 may store a weight for each layer of the neural network model and perform the function of a MAC operation device configured to simultaneously perform matrix multiplication and summation (the MAC operation).

The merging module 367 may merge operation result values parallelized by merging pieces of output data of the plurality of XCOREs. The merging module 367 may merge intermediate data fetched by a partial sum direct memory access (PSDMA) 368 from the data memory 340 with the output data of the XCORE 365 by using the PSDMA 368.

The neural network device 360 may further include the PSDMA 368 that reads intermediate result data operated in a previous layer of the neural network model from the data memory 340 and transfers the intermediate result data to the merging module 367. The neural network device 360 may drive the neural network model having a long channel by using the merging module 367 and the PSDMA 368.

The post-processing module 366 may perform an additional neural network operation on a result value of the MAC operation. The additional neural network operation may include pooling, batch normalization, activation operations, and the like. A plurality of neural network operations in the post-processing module 366 may be driven in at least one mode according to PTCU control signals. In addition, when all of the PTCU control signals are disable signals, only the result value of the MAC operation may be transferred to the OSU 369 without performing the neural network operations in the post-processing module 366.

The OSU 369 may store output data of the neural network device 360 or the post-processing module 366 in the data memory 340. The OSU 369 may adjust the bit representation of the output data to 4 bits, 8 bits, 16 bits, or the like and store the output data in the data memory 340. Through the adjustment of the bit representation of the output data, the OSU 369 may adjust the amount of feature information for each layer of the neural network model.

Figure 4A:
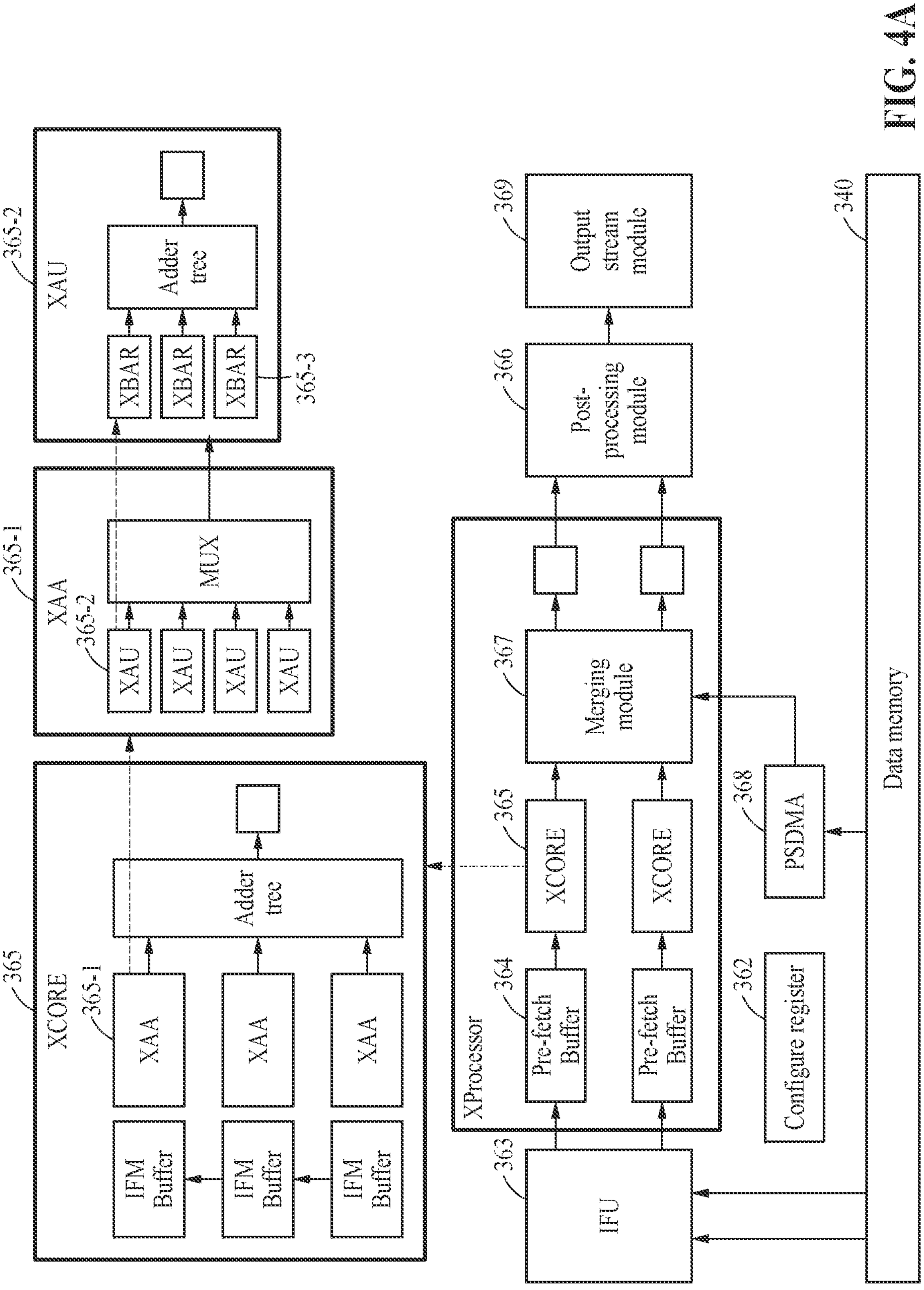
FIGS. 4A and 4B illustrate an example of overall operations of a flexible neural network device.
Figure 4B:
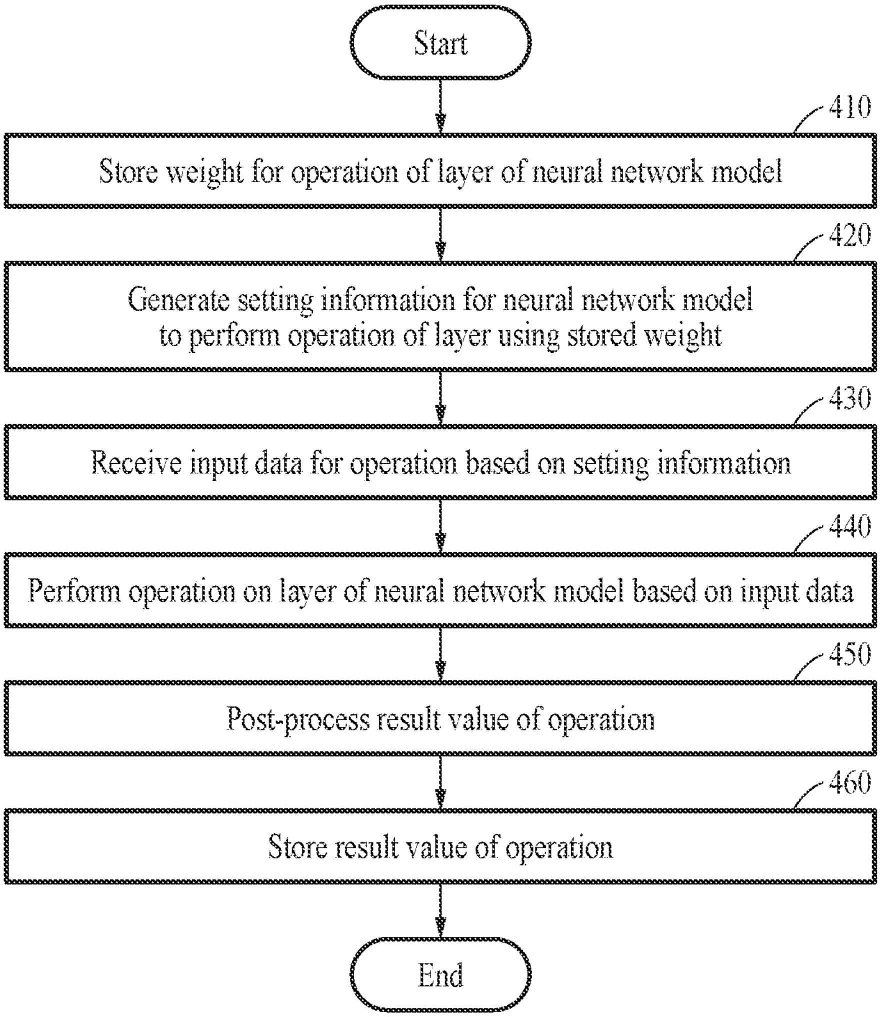

FIGS. 4A and 4B illustrate an example of overall operations of a flexible neural network device (e.g., the neural network device 360).

FIG. 4A shows an example in which two XCOREs are provided in the neural network device 360, three XAAs 365-1 are provided in one XCORE 365, four XAUs 365-2 are provided in one XAA 365-1, and three XBARs 365-3 are provided in one XAU 365-2. However, examples described below are not limited to the particular case described above.

The neural network device 360 may store weights for the operations of the layers of a neural network in the XBAR 365-3 that performs the MAC operation, before the electronic device 300 is driven.

The control module 361 may generate information on a configure register (e.g., the configure register 362) and a control signal which are setting information for the XCORE 365, the input module 363, the post-processing module 366, the PSDMA 368, and the OSU 369 of the electronic device 300 to be driven. The input module 363 may fetch input data for the MAC operation from the data memory 340 according to the configure register (e.g., the configure register 362) and the control signal. The input module 363 may transmit the input data for the MAC operation to the pre-fetch buffer 364. The pre-fetch buffer 364 may temporarily store the data received from the input module 363 in an internal buffer of the pre-fetch buffer 364 and transmit the data to the XCORE 365. At this time, the control signal may be transmitted and received between the input module 363 and the control module 361 according to an allocation state of the data in the internal buffer of the pre-fetch buffer 364.

The MAC operation may be performed by the XBAR 365-3 according to the control signal. Result values of the MAC operation may be merged by the merging module 367. When the configure register includes the setting information of the PSDMA 368, the PSDMA 368 may fetch intermediate result data operated in the previous layer from the data memory 340 according to the setting information and transmit the intermediate result data to the merging module 367. The result values of the MAC operation merged by the merging module 367 may be transmitted to the post-processing module 366 for the post-processing operation. When the post-processing operations of pooling, batch normalization, activation, and output result bit conversion (e.g., the selector 366-2-4) are completed by the post-processing module 366 according to the setting information of the configure register, the OSU 369 may store output data converted into the bit representation according to a configure register value in the data memory 340.

Referring to FIG. 4B, in operation 410, a neural network device (e.g., the neural network device 360) may store a weight for an operation of a layer. The weight for the operation may be stored in the operation module.

In operation 420, the neural network device may generate setting information for performing the operation of the layer using the stored weight. The setting information may include a configure register and a control signal.

In operation 430, the neural network device may receive input data for the operation based on the setting information. An input module (e.g., the input module 363) of the neural network device may fetch input data for the MAC operation from data memory (e.g., the data memory 340) according to the configure register and the control signal. Operations 410, 420, and 430 do not need to be performed in the order described above and it is enough that all of operations 410, 420, and 430 are performed in any order before performing operation 440, since operations 410, 420, and 430 do not affect each other. In the description and drawings herein, it is described that operations 410, 420, and 430 are sequentially performed, but the examples are not limited to performing operations according to such a particular order.

In operation 440, the neural network device may perform an operation on a layer of the neural network model based on the input data. The operation on the layer of the neural network model may include correcting a distribution and average of operation results.

In operation 450, the neural network device may post-process an operation result value of the layer of the neural network model. The post-processing of the operation result value of the layer of the neural network model may include performing a post-processing operation of pooling, batch normalization, activation, and output value bit conversion (e.g., the selector 366-2-4), and storing a result value of the operation converted from a result of the post-processing operation according to the setting information.

In operation 460, the neural network device may store a result value of the layer operation of the neural network model. The storing of the result value of the layer operation may include merging result values of a previous layer of the neural network model through a merging module. The storage of the result values of the layer operation may include storing the result value of the layer operation in the data memory (e.g., the data memory 340) through a post-processing module (e.g., the post-processing module 366) and an output stream module (e.g., the output stream module 369).

Figure 5A:
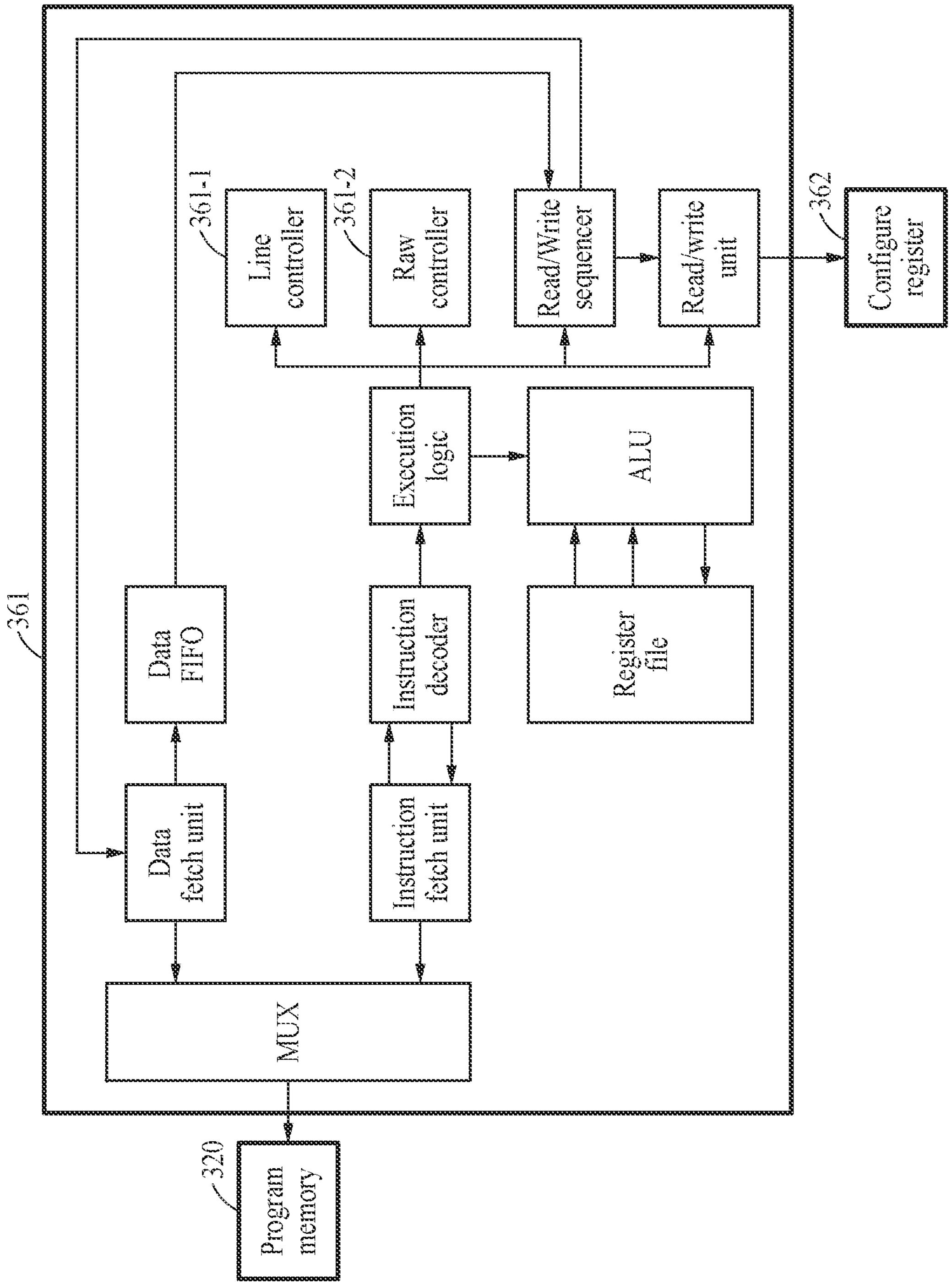
FIGS. 5A and 5B illustrate an example of generating a control signal and a configure register in a flexible neural network device.
Figure 5B:
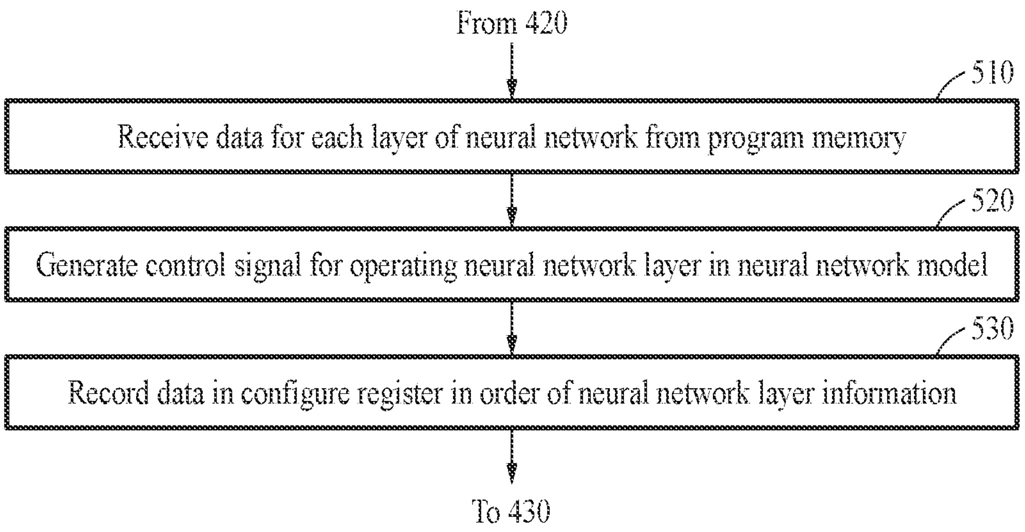

FIGS. 5A and 5B illustrate an example of generating a control signal and a configure register (e.g., the configure register 362) in a flexible neural network device (e.g., the neural network device 360).

The control signal and the configure register 362 may be used to drive the neural network device 360. Referring to FIG. 5A, the control module 361 may operate in the same manner of a direct memory access (DMA) to read information from a program memory 320 for each layer and set the configure register 362. The control module 361 may directly read and write data for data having a bit number (e.g., 20 bits) in a predetermined range or less. The control module 361 may control an operation flow between layers by performing setting and waiting for one layer. The control module 361 may generate a control signal for operating a module included in the neural network device 360 in one layer.

The control signal may include a signal for a line controller 361-1 and a signal for a raw controller 361-2. The control signal may include a signal for controlling the neural network device 360 to move input feature map data between different types of buffers, a signal for controlling the neural network device 360 to move input feature map data between the same type of buffers, and a signal for notifying that an output value generated in a specific cycle is valid.

The signal for the line controller 361-1 may be a signal that waits until a processor of the control module 361 operates a separate small hardware engine and finishes the operation. The control module 361 may generate the signal for the line controller 361-1 for the operation of each cycle. Among signals for the line controller 361-1, an ifm_pop signal may move data of a pre-fetch buffer (e.g., the pre-fetch buffer 364) to IFM_BUFFER. Among the signals for the line controller 361-1, a shift_en signal may be a signal that causes a data shift between IFM_BUFFERs, and may be generated first to perform an operation with corresponding data. Among the signals for the line controller 361-1, an out_valid signal may be a signal indicating that the output is valid. The signals for the line controller 361-1 should be properly delayed and used at a final output stage. When the ifm_pop signal is transferred to the pre-fetch buffer (e.g., the pre-fetch buffer 364), the pre-fetch buffer may read data and transfer the data to the IFM_BUFFER. When there is no data in the pre-fetch buffer 364, the corresponding signal may wait until the data is prepared.

The signal for the row controller 361-2 may be a signal directly generated by the control module 361 to control the operation module.

A read/write sequencer and a read/write unit may perform a read/write operation of values related to the configure register 362. A register file may be operated in an arithmetic logic unit (ALU) according to an execution logic, and an instruction decoder may share information on an instruction fetch unit and the execution logic. A data FIFO, that manages data related to the read/Write sequencer may be managed by the data fetch unit, and both the instruction fetch unit and the data fetch unit may become signals of a single line through the MUX and may be transmitted to the program memory 320.

The instructions that may be provided by the control module 361, including the control signal, may be as shown in Table 1 below, for example.

TABLE 1

| ASM | OPCODE | Description |
|---|---|---|
| NOP | 0 | Simple cycle consumption with No Operation |
| LINE__CTRL | 1 | Start LINE__CTRL Block and wait until a corresponding operation ends (LOOP COUNT, Bit Control etc. exist) |
| RAW__CTRL | 2 | Directly generate a control signal based on given data (LOOP COUNT exists) |
| RD | 3 | Read data through RW Port of NMP and store the data in Ra Ra ← READ__NMP(ADDR__20b) |
| WR | 4 | Write 20b data through RW Port of NMP WRITE__NMP (addr = R__BASE + addr__offset8b, data = WDATA20b) |
| — | 5 | Reserved |
| MOV | 6 | if R2R == 1 {Ra ← Rb} else {Ra ← imm20} |
| ALUR | 7 | Calculate as Ra + Ra op Rb (see ARITH FILED: SUB, ADD, AND, OR) |
| ALUI | 8 | Calculate as Ra ← Rb op Immediate (see ARITH FILED: SUB, ADD, AND, OR) |

TABLE 1-continued

| ASM | OPCODE | Description |
|---|---|---|
| SHIFT | 9 | Ra ← Ra (shift left/right) immediate |
| SWR | 0xA | Read Ra pieces of Data (32b) from an address of Address20b in CODE_SRAM and sequentially write from R_BASE through RW Port of NMP<br>for (i = 0; i < Ra; i = i + 1) {<br>DATA ← READ_SRAM(ADDR_20b + i)<br>WRITE_NMP(R_BASE + i, DATA32b)<br>} |
| — | 0xB | Reserved |
| JMP | 0xC | In case where COND = 0, Branch to Target Address without conditions<br>In case where COND = 1, if Ra == Rb, Branch to Target Address, and if DEC == 1, Update with Ra value − 1 |
| SET_EV | 0xD | Transmit IRQ and information to CM4 (EVENT 20b) |
| WFI | 0xE | Wait for Interrupt |
| HALT | 0xF | Halt (End of control of PTCU)<br>With Program end, PTCU is in a STOP state, PC is changed to initial value |

The data structures of the instructions that may be provided by the control module 361, shown in Table 1, may be as shown in Table 2 below, for example.

TABLE 2

| | 31 | 30 | 29 | 28 | 27 | 26 | 25 | 24 | 23 | 22 | 21 | 20 | 19 | 18 | 17 | 16 | 15 | 14 |
|---|---|---|---|---|---|---|---|---|---|---|---|---|---|---|---|---|---|---|
| NOP | | 0x0 | | | | | | | | | | | | | | | | |
| LINE_CTRL | | 0x1 | | | | | | | LOOP_COUNT | | | | ctrl | | | TWO | OI | |
| RAW_CTRL | | 0x2 | | | | | | | LOOP_COUNT | | | | ctrl | | | TWO | OI | |
| RD | | 0x3 | | | | Ra | | | | | | | | | Address (20b) | | | |
| WR | | 0x4 | | | | | | | ADDR_OFFSET(8b) | | | | | | WDATA (20b) | | | |
| — | | | | | | | | | | | | | | | | | | |
| MOV | | 0x6 | | | | Ra | | | Rb | | R2R | | | | WDATA (20b) | | | |
| ALUR | | 0x7 | | | | Ra | | | Rb | | ARITH | | | | Unused | | | |
| ALUI | | 0x8 | | | | Ra | | | Rb | | ARITH | | | | Immediate | | | |
| SHIFT | | 0x9 | | | | Ra | | | | | LEFT/RIGHT | | | | | | | |
| SWR | | 0xA | | | | Ra | | | Rb | | | | | | Address (20b); Code SRAM Address | | | |
| — | | | | | | | | | | | | | | | | | | |
| JMP | | 0xC | | | | Ra | | | Rb | | COND | DEC | | | Address (20b) | | | |
| SET_EV | | 0xD | | | | | | | | | | | | | EVENT_VALUE (20b) | | | |
| WFI | | 0xE | | | | | | | | | | | | | | | | |
| HALT | | 0xF | | | | | | | | | | | | | | | | |

| | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| NOP | | | | | | | | | | | | | | |
| LINE_CTRL | OV | POP | Shift | act_sel | | bias_sel | | | xau_stream_en | | | | | |
| RAW_CTRL | OV | POP | Shift | act_sel | | blas_sel | | | xau_stream_en | | | | | |
| RD | | | | | | Address (20b) | | | | | | | | |
| WR | | | | | | WDATA (20b) | | | | | | | | |
| — | | | | | | | | | | | | | | |
| MOV | | | | | | WDATA (20b) | | | | | | | | |
| ALUR | | | | | | Unused | | | | | | | | |
| ALUI | | | | | | Immediate | | | | | | | | |
| SHIFT | | | | | | | | | | | | | | |
| SWR | | | | | | Address (20b); Code SRAM Address | | | | | | | | |
| — | | | | | | | | | | | | | | |
| JMP | | | | | | Address (20b) | | | | | | | | |
| SET_EV | | | | | | EVENT_VALUE (20b) | | | | | | | | |
| WFI | | | | | | | | | | | | | | |
| HALT | | | | | | | | | | | | | | |

Referring to Table 2, an RD instruction of the control module 381 may read data by accessing the configure register 362 with a given 20-bit address and store the data in a register designated in Ra. An RD operation may consume two cycles in total by consuming one cycle for address issues related to the address and one cycle to read data and update the data in the register.

A WR instruction may perform writing on the configure register 362 by using a value obtained by adding R_BASE (R5) and ADDR_OFFSET (8b) as an address. At this time, a value in the field of WDATA (20b) of the instruction may be used for data, and upper bits exceeding the bit number (e.g., 20 bits) in a predetermined range or less may be padded as 0.

A MOV instruction may be used for register-to-register transfer and storage of 20b immediate value in the register.

An ALUR instruction may perform SUB, ADD, AND, and OR operations with reference to an ARITH field.

An ALUI instruction may perform SUB, ADD, AND, and OR operations with reference to the ARITH field. At this time, unlike ALUR, an immediate value may be used instead of Ra.

A SHIFT instruction may shift the data to the left by 1 bit when a LEFT/RIGHT field is "0", and may shift the data to the right by 1b when the LEFT/RIGHT field is "1".

A SWR instruction may provide a DMA-like function to set the configure register 362. For example, data of a value stored in the Ra register+1 may be read from an address (20b) in the program memory 320 and written on the configure register 362 sequentially from the R_BASE address. For example, the configuration data for each layer may be stored in a specific area of the program memory 320 through the SWR instruction and may be set in the configure register 362.

A JMP instruction may perform a jump to a target address according to COND and DEC. In a case of branching, a previous instruction read by next_pc may not be used and is thus discarded, and a stall of 1 cycle is implemented. When COND==0, a program counter (PC) value may be changed to the target address without any condition, and when COND==1, the PC value moves to the target address when Ra and Rb values are the same. Otherwise, the instruction of the next PC (nextjpc) may be executed. When DEC is 1, the Ra value may be updated to Ra-1. When REG[Ra] and REG[Rb] are different, the PC value may move to the target address, and when REG[Ra] and REG[Rb] are the same, the PC value may move to the next address by increasing the PC by 1. Also, when DEC is "1", the REG[Ra] value may be decreased by 1.

A SEV instruction may cause an interrupt to the MCU. At this time, the 20b value of EVENT_VALUE may be transferred to the configure register 362 such that MCU and HOST may read the value.

A WFI instruction may make PTCU wait until it receives a separate IRQ signal. In the WFI instruction state, most functions may be in a gated state.

A HALT instruction may refer to that the PTCU completed all instructions and the program execution is terminated.

The configure register 362 related to the execution of the control module 361 may be as shown in Table 3 below, for example.

TABLE 3

| Configuration | Bits | Description |
|---|---|---|
| PTCU_START | 1 | Receive 1 when PTCU starts. |
| IRQ_EN | 1 | When generating IRQ through SEV, if "1", transmit IRQ, if not, IRQ is not transmitted. |
| CODE_BASE | 20 | Initial value of PC |
| FORCE_RESET | 1 | AND with internal RESET signal |

Referring to FIG. 5B, in operation 510, a neural network device (e.g., the neural network device 360) may receive data for each layer of the neural network from the program memory 320. The receiving of the data for each layer of the neural network may include preprocessing data according to an operation scenario of the neural network device.

In operation 520, the neural network device may generate a control signal for operating a neural network layer in the neural network. The control signal may include a signal for controlling the neural network device to move input feature map data between different types of buffers, a signal for controlling the neural network device to move input feature map data between the same type of buffers, and a signal for notifying that an output value generated in a specific cycle is valid.

In operation 530, the neural network device may record data in a configure register (e.g., the configure register 362) in the order of neural network layer information. The information to be recorded in the configure register may vary depending on the operation scenario of the neural network device.

Figure 6A:
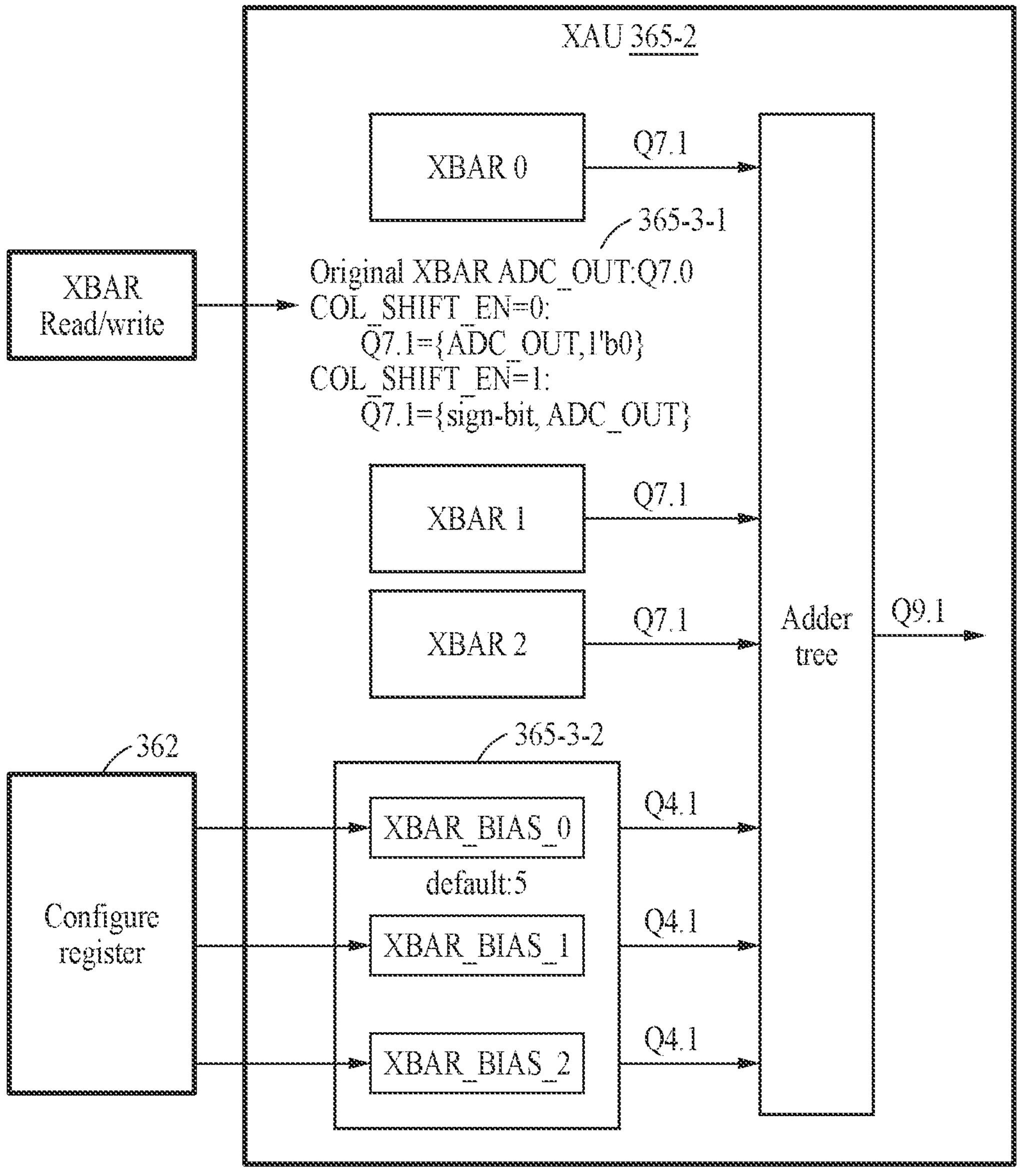
FIGS. 6A and 6B illustrate an example of correcting an operation result value of a flexible neural network device.
Figure 6B:
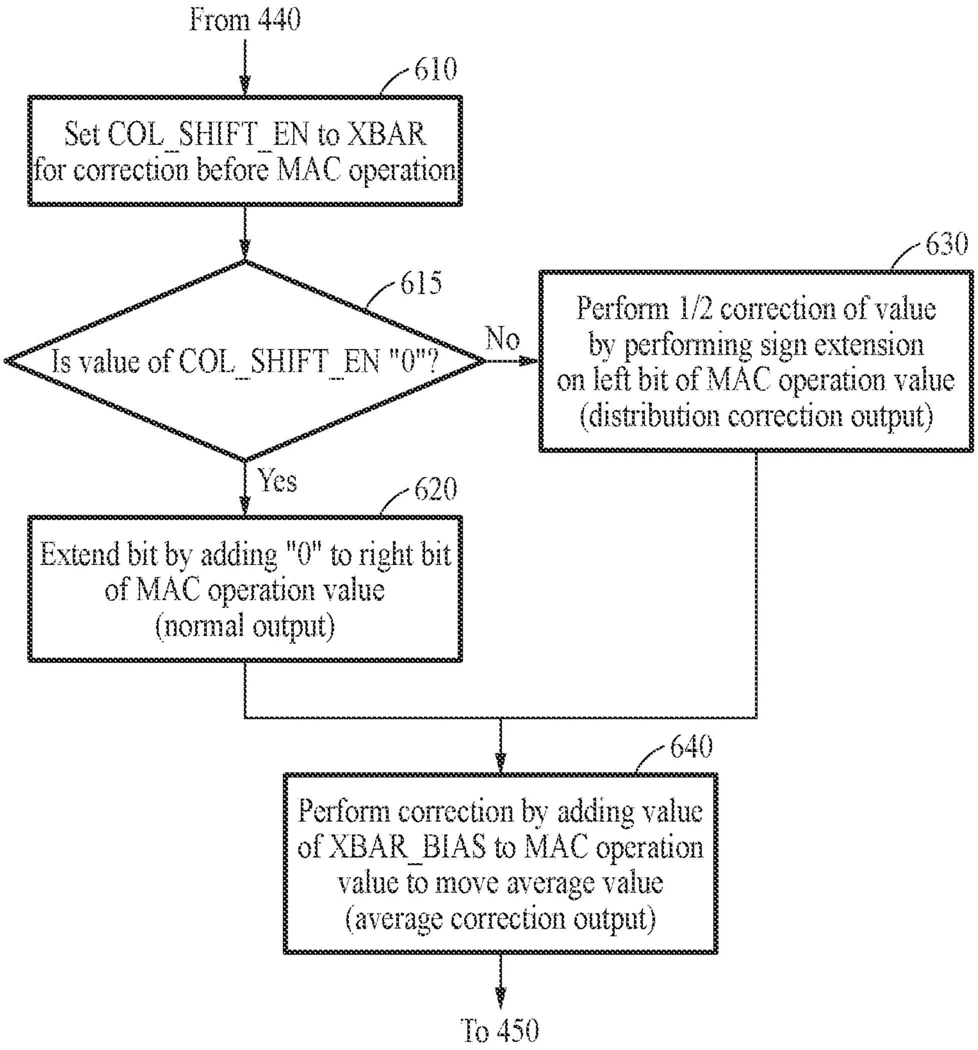

FIGS. 6A and 6B illustrate an example of correcting an operation result value of a flexible neural network device (e.g., the neural network device 360).

Referring to FIG. 6A, an XBAR (e.g., the XBAR 365-3) executing a MAC operation in the neural network device may be implemented in the in-memory computing form using various memory devices such as a magnetoresistive RAM (MRAM), a phase-charge RAM (PRAM), a resistive RAM (ReRAM), SRAM, etc. In a case of using an analog memory device, noise may occur according to device characteristics, and a calculated median value may be biased to one side or a range of the calculated values may appear to be too small or large due to the noise. To solve such problems, the neural network device of one or more embodiments may normally output the data or may correct and output the data by using COL_SHIFT_EN 365-3-1 and XBAR_BIAS 365-3-2 in the XAU 365-2.

Referring to FIG. 6B, in operation 610, when a correction range value is a first predetermined value, the operation module of the neural network device may reduce a byte size of a digital value of a result of an operation, and when the correction range value is a second predetermined value, the operation module may extend the byte size of the digital value of the result of the operation. The operation module may set COL_SHIFT_EN to the XBAR 365-3 for correction. COL_SHIFT_EN may be included in the configure register 362 and may be a signal capable of adjusting a bit position when a weight is written to the XBAR 365-3.

In operation 615, the neural network device may determine whether a value of COL_SHIFT_EN is "0". When the value of COL_SHIFT_EN is "0", in operation 620, the neural network device may extend the bit by adding "0" to a right bit of the analog-digital conversion value of the analog XBAR and perform normal output while maintaining the size of the data value. In operation 615, the neural network device may determine whether the value of COL_SHIFT_EN is "0". When the value of COL_SHIFT_EN is not "0" but "1", in operation 630, the neural network device may perform distribution correction output by correcting a distribution of result values of the MAC operation by a method of reducing the size of the value to ½ by applying (sign extension) a sign bit to a left bit of the value converted from the analog value of the analog XBAR to the digital value. That is, the neural network device of one or more embodiments may solve the problem of the appearing of the range of the MAC operation values of the analog XBAR too large or too small by applying the value of COL_SHIFT_EN. In operation 640, the neural network device may perform average correction output of performing the correction by adding a value of XBAR_BIAS to the MAC operation value to move an average value. In operation 640, the neural network device may move a center value of the operation based on a center value movement range value. The neural network device of one or more embodiments may move the center value by the value of XBAR_BIAS to the value of size of the value corrected by COL_SHIFT_EN using XBAR_BIAS, a setting value in the configure register, thereby solving the phenomenon that the center value is biased to one side.

Figure 7A:
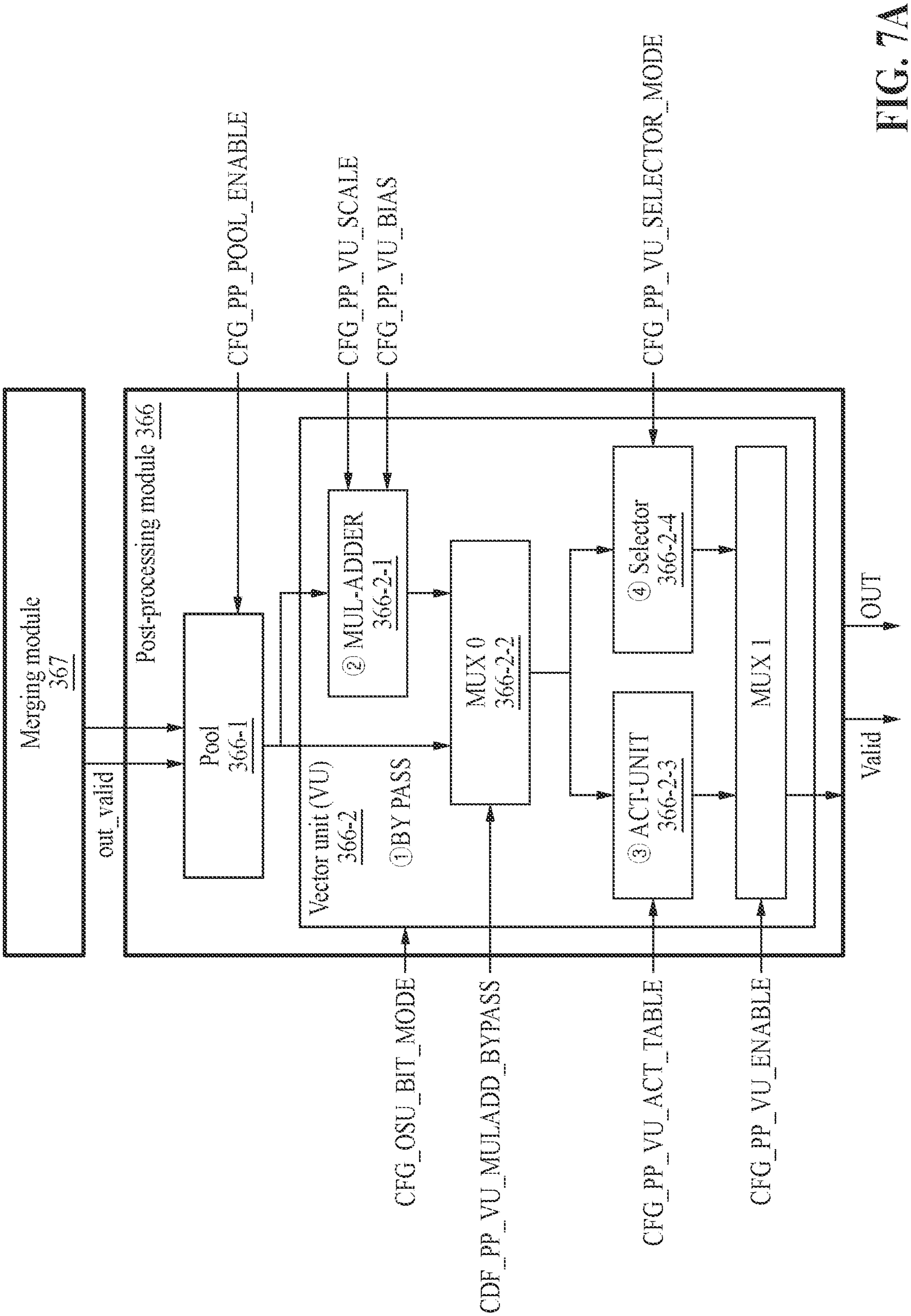
FIGS. 7A and 7B illustrate an example of a post-processing operation of a flexible neural network device.
Figure 7B:
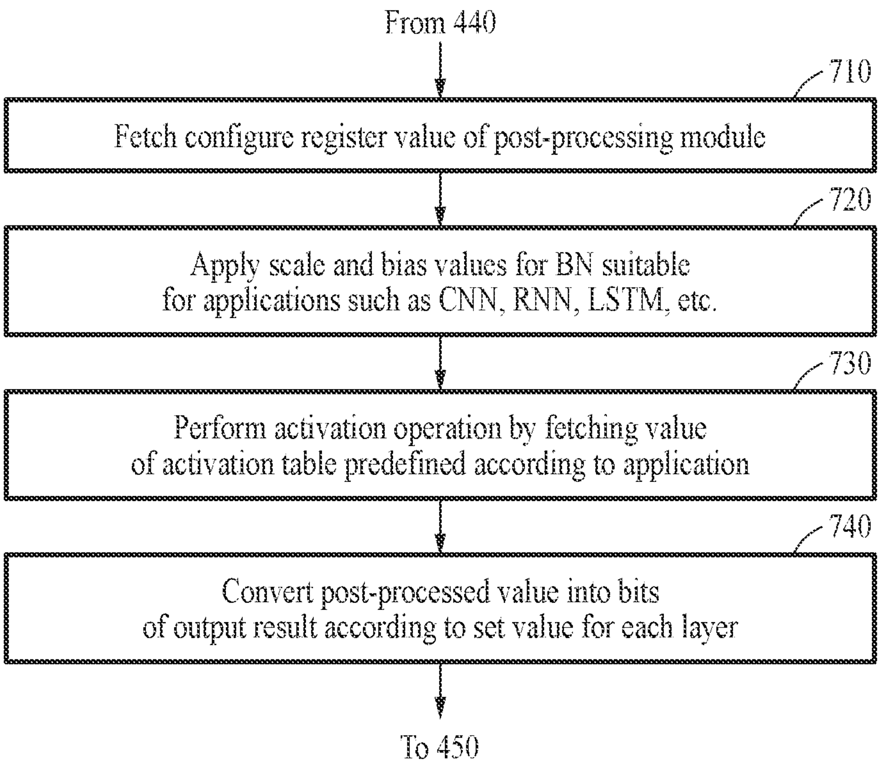

FIGS. 7A and 7B illustrate an example of a post-processing operation of a flexible neural network device (e.g., the neural network device 360).

Referring to FIG. 7A, MAC operation output data in the neural network device may be transferred to the post-processing module 366 through the merging module 367. The post-processing module 366 may perform performing a post-processing operation of pooling, batch normalization, activation, and output value bit conversion (e.g., the selector 366-2-4), and storing a result value of the operation obtained by converting a result of the post-processing operation based on setting information. The post-processing module 366 may perform the post-processing operation, when a signal value for notifying that an output value generated in a specific cycle is valid is received.

A Pool 366-1 may be selectively driven according to the configure register. For example, a layer of the neural network may be flexibly configured, as it is possible to determine whether to perform 2×2 MAX pooling or 1×2 MAX pooling according to the configure register.

The post-processing module 366 may implement a batch normalization operation and an activation operation collectively into a vector unit (VU) 366-2. When MUL-ADDER 366-2-1 (which performs the batch normalization operation in the vector unit 366-2) is directly connected to an ACT-UNIT 366-2-3 (which performs the activation operation), the neural network device of one or more embodiments may perform the post-processing operation of neural network immediately without a separate intermediate buffer, and thus, the neural network device of one or more embodiments may efficiently operate the movement of data. In addition, the MUX 366-2-2 may be provided between the batch normalization operation and the activation operation for more flexible operation. The post-processing operations may be configured as four combinations of post-processing operations of the neural network, such as an activation operation after bypass, an operation in a Selector 366-2-4 after bypass, an operation in the ACT-UNIT 366-2-3 after an operation in the MUL-ADDER 366-2-1, and an operation in the Selector 366-2-4 after an operation in the MUL-ADDER 366-2-1 according to the configure register. The Selector 366-2-4 may convert a result value of the post-processing module 366 in the form of bits to be output according to OSU_BIT_MODE and PP_VU_SELECT_MODE in the configure register. The Selector 366-2-4 may adjust positions of integer and fraction for each bit at the time of converting the bit form of the result value, and thus, the neural network device of one or more embodiments may selectively adjust the amount of feature information according to layer characteristics, thereby configuring various operating methods.

Referring to FIG. 7B, in operation 710, the neural network device (e.g., the neural network device 360) may fetch a configure register value of a post-processing module (e.g., the post-processing module 366).

In operation 720, the neural network device may apply a scale value and a bias value for batch normalization (BN) suitable for applications such as a CNN, RNN, LSTM, and the like. The neural network device may selectively use a plurality of scale values and bias values according to a scale_bias_sel signal generated by a control module (e.g., the control module 361) when performing the batch normalization operation in the vector unit 366-2. The neural network device of one or more embodiments may reduce the additional data movement at the time of the post-processing operation through the supply of the scale values and the bias values through the configure register.

In operation 730, the neural network device may perform the activation operation by fetching a value of activation_table predefined according to an application. Even when performing the activation operation, several values of activation_table may be selectively used according to an act_sel signal generated by the control module 361. The neural network device of one or more embodiments may reduce the additional data movement at the time of the post-processing operation through the supply of the value of activation_table through the configure register.

In operation 740, the neural network device may convert the post-processed value into bits of an output result according to a set value for each layer. The neural network device of one or more embodiments may obtain bit values of output results for various scenarios according to the set values including the configure register for each layer.

Figure 8A:
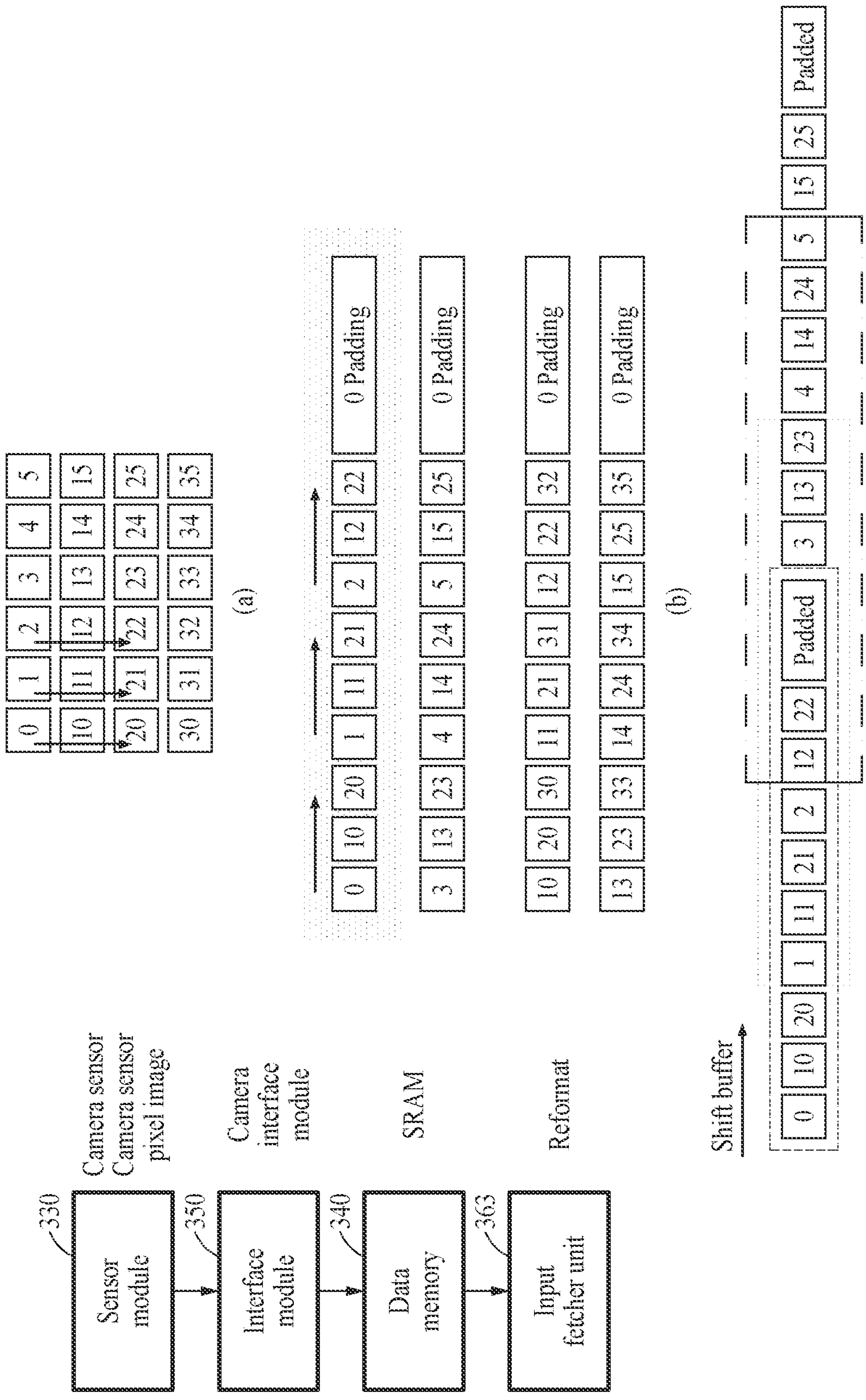
FIGS. 8A and 8B illustrate an example of pre-processing an image through a flexible neural network device.
Figure 8B:
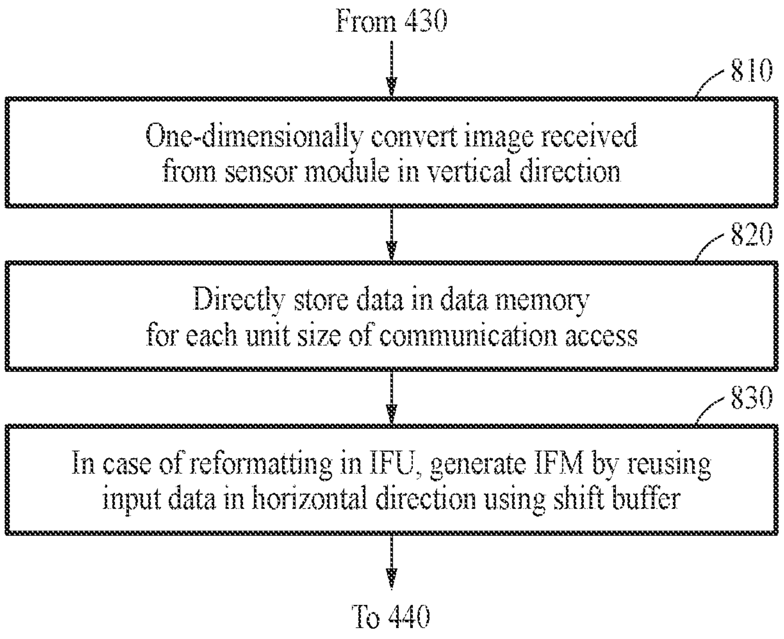

FIGS. 8A and 8B illustrate an example of pre-processing an image through a flexible neural network device (e.g., the neural network device 360).

In a case of multi-channel input data, a CNN model, that may be used in an application field of a neural network, such as image recognition, may use an image having three input channels of RGB as first input data. In this application, there may be two problems: a problem regarding low usage of the XBAR and a problem regarding storage of data memory (e.g., the data memory 340) that has to be performed according to minimum usage bits. In order to solve such problems, the neural network device of one or more embodiments may pre-process the multi-channel input data in the form of linear data.

FIG. 8A shows a process of performing the preprocessing of data on an image before the operation of the image by the sensor module 330, the interface module 350, the data memory 340, and the input module 363.

Referring to a section (a) of FIG. 8A, the neural network device may include an interface module (e.g., the interface module 350) that converts the received input data related to the data in a column direction. The interface module 350 may combine the pieces of the input data in the column direction and convert the input data into linear data as shown in a section (b). The converted data may be transferred in a horizontal direction through a shift buffer and processed as in a section (c).

Referring to FIG. 8B, in operation 810, an interface module (e.g., the interface module 350) of a neural network device (e.g., the neural network device 360) may one-dimensionally convert an image received from a sensor module (e.g., the sensor module 330) in a vertical direction. The one-dimensional conversion of the image may correspond to, for example, the conversion in the sections (a) and (b) of FIG. 8A.

In operation 820, the neural network device may further include a memory that performs a processing operation while reusing data through the shift buffer. The neural network device may store data in data memory (e.g., the data memory 340) for each unit size of communication access through the interface module. The neural network device may combine three pieces of input data in the column direction and store the input data in units of 128 bits, the minimum usage bits of the data memory.

In operation 830, the neural network device may reformat the data stored in the data memory through an input module (e.g., the input module 363), and then reformat the data into data to be used in the pre-fetcher buffer and used, while reusing the data in a horizontal direction using the shift buffer.

Figure 9:
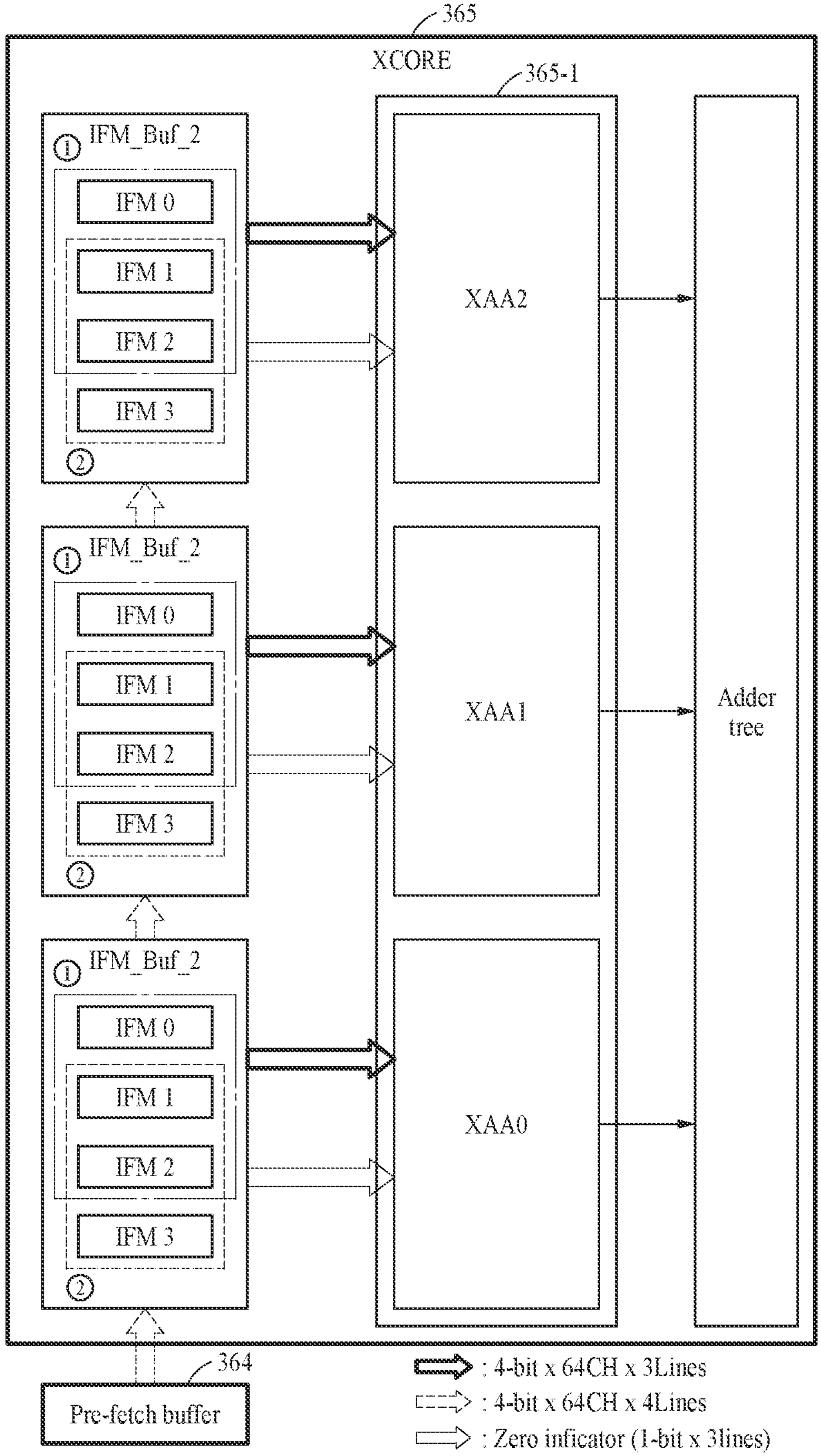
FIG. 9 illustrates an example of input feeding of a flexible neural network device.

FIG. 9 illustrates an example of input feeding of a flexible neural network device (e.g., the neural network device 360).

FIG. 9 shows an input feeding method of the device. The input feeding method may include preprocessing data for the training of an RNN and an LSTM which are mainly used for natural language processing and the like. An RNN and an LSTM correspond to neural network models that update parameters according to a state of a hidden layer at a previous time and a current input vector value.

An input module (e.g., the input module 363) of the neural network device may perform storing a result of an operation in a buffer and receiving the stored result of the operation in a predetermined order.

The neural network device may connect an input to a plurality of XAA 365-1 in the form of a shift buffer and transfer a 4-line input to the XAA 365-1 by 3 lines, through a structure of storing results of operating the same input at once and then fetching them sequentially. For example, when the input module inputs an input vector $X_t$ and the state of the hidden layer at the previous time to the pre-fetch buffer 364 as the same data, the plurality of XAAs 365-1, that has received them, may perform a linear operation using the same input and different weights.

The electronic devices, microprocessors, program memories, sensor modules, data memories, interface modules, neural network devices, control modules, program memories, line controllers, configure registers, input modules, pre-fetch buffers, XCOREs, operation modules, post-processing modules, merging modules, PSDMAs, OSUs, electronic device 300, microprocessor 310, program memory 320, sensor module 330, data memory 340, interface module 350, neural network device 360, control module 361, line controller 361-1, row controller 361-2, configure register 362, input module 363, pre-fetch buffer 364, XCORE 365, operation modules 365, 365-1, 365-2, and 365-3, post-processing module 366, merging module 367, PSDMA 368, OSU 369, and other apparatuses, devices, units, modules, and components disclosed and described herein with respect to FIGS. 1-9 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A device comprising:

one or more processors comprising:

an operation module configured to store and operate a weight for an operation of a layer of a neural network model;

a control module configured to generate setting information for performing the operation of the layer by the neural network model using the stored weight;

an input module configured to receive input data for the operation of the layer based on the generated setting information;

a merging module configured to receive operation results of the operation of the layer from the operation module and merge the received operation results of the layer;

a post-processing module configured to receive the merged operation results of the layer from the merging module and post-process the received merged operation results of the layer; and an output stream module configured to convert and store the post-processed operation results based on the generated setting information.

2. The device of claim 1, wherein, for the generating of the setting information, the control module is configured to:

generate information on a configure register configured to drive the device based on setting data for the operation of the layer; and generate information on a control signal for controlling an operation according to cycles of the device.

3. The device of claim 2, wherein the control signal comprises:

a signal for controlling the device to move input feature map data between different types of buffers;

a signal for controlling the device to move input feature map data between a same type of buffers; and a signal for notifying that an output value generated in a specific cycle is valid.

4. The device of claim 1, wherein, for the operation of the layer of the neural network model, the operation module is configured to:

in response to a correction range value being a predetermined first value, reduce a byte size of a digital value of an operation result; and in response to the correction range value being a predetermined second value, extend the byte size of the digital value of the operation result.

5. The device of claim 1, wherein, for the operation of the layer of the neural network model, the operation module is configured to move a center value of the operation based on a center value movement range value.

6. The device of claim 1, wherein, for the post-processing of the merged operation results of the layer, the post-processing module is configured to:

perform a post-processing operation of any one or any combination of any two or more of pooling, batch normalization, activation, and output result bit conversion; and store a result value of the operation obtained by converting a result of the post-processing operation based on the setting information.

7. The device of claim 6, wherein, for the post-processing operation, the post-processing module is configured to perform the post-processing operation, in response to a signal value for notifying that an output value generated in a specific cycle is valid being received.

8. The device of claim 1, further comprising an interface module configured to, for the receiving of the input data, convert the received input data related to data in a column direction.

9. The device of claim 1, further comprising a memory configured to, for the receiving of the input data, reformat data while reusing the data through a shift buffer.

10. The device of claim 1, wherein the input module is further configured to:

store the operation result in a buffer; and receive the stored operation result in a predetermined order.

11. The device of claim 1, wherein the operation module has a hierarchical structure.

12. A processor-implemented method, the method comprising:

storing and operating, by an operation module of one or more processors, a weight for an operation of a layer of a neural network model;

generating, by a control module of the one or more processors, setting information for performing the operation of the layer by the neural network model using the stored weight;

receiving, by an input module of the one or more processors, input data for the operation based on the generated setting information;

receiving, by a merging module of the one or more processors, operation results of the operation of the layer from the operation module and merging the received operation results of the layer;

post-processing, by a post-processing module of the one or more processors, a result value of the performing of the operation of the layer based on the received input data; and converting and storing, by an output stream module of the one or more processors, the result value of the post-processed operation based on the generated setting information.

13. The method of claim 12, wherein the generating of the setting information comprises:

generating information on a configure register configured to drive a device based on setting data for the operation of the layer; and generating information on a control signal for controlling an operation according to cycles of the device.

14. The method of claim 12, wherein the control signal comprises:

a signal for controlling a device to move input feature map data between different types of buffers;

a signal for controlling the device to move input feature map data between a same type of buffers; and a signal for notifying that an output value generated in a specific cycle is valid.

15. The method of claim 12, wherein the operation of the layer of the neural network model comprises:

in response to a correction range value being a predetermined first value, reducing a byte size of a digital value of the operation result; and in response to the correction range value being a predetermined second value, extending the byte size of the digital value of the operation result.

16. The method of claim 12, wherein the operation of the layer of the neural network model comprises moving a center value of the operation based on a center value movement range value.

17. The method of claim 12, wherein the post-processing of the result value of the operation comprises:

performing a post-processing operation of any one or any combination of any two or more of pooling, batch normalization, activation, and output result bit conversion; and storing the result value of the operation obtained by converting a result of the post-processing operation based on the setting information.

18. The method of claim 16, wherein the post-processing operation is performed in response to a signal value for notifying that an output value generated in a specific cycle is valid being received.

19. The method of claim 12, wherein the receiving of the input data for the operation comprises converting the received input data related to data in a column direction.

20. The method of claim 12, wherein the receiving of the input data for the operation comprises reformatting data while reusing the data through a shift buffer.

* * * * *